United States Patent
Uensal et al.

(10) Patent No.: US 7,736,778 B2
(45) Date of Patent: Jun. 15, 2010

(54) PROTON CONDUCTING POLYMER MEMBRANE COMPRISING PHOSPHONIC ACID GROUPS CONTAINING POLYAZOLES AND THE USE THEREOF IN FUEL CELLS

(75) Inventors: Oemer Uensal, Mainz (DE); Joachim Kiefer, Losheim am See (DE); Gordon Calundann, North Plainfield, NJ (US); Michael Sansone, Berkeley Heights, NJ (US); Brian Benicewicz, Loudonville, NY (US); Eui Wong Choe, Randolph, NJ (US)

(73) Assignee: BASF Fuel Cell GmbH, Frankfurt (DE)

( * ) Notice: Subject to any disclaimer, the term of this patent is extended or adjusted under 35 U.S.C. 154(b) by 0 days.

(21) Appl. No.: 10/530,002

(22) PCT Filed: Oct. 2, 2003

(86) PCT No.: PCT/EP03/10906

§ 371 (c)(1),
(2), (4) Date: Aug. 22, 2005

(87) PCT Pub. No.: WO2004/033079

PCT Pub. Date: Apr. 22, 2004

(65) Prior Publication Data

US 2006/0008690 A1    Jan. 12, 2006

(30) Foreign Application Priority Data

Oct. 4, 2002   (DE) ................ 102 46 459

(51) Int. Cl.
*H01M 8/10* (2006.01)
*B01J 49/00* (2006.01)
*C08J 5/20* (2006.01)
*B01J 41/12* (2006.01)

(52) U.S. Cl. .............. 429/33; 521/27; 521/30
(58) Field of Classification Search ........... 429/33; 521/27, 30
See application file for complete search history.

(56) References Cited

U.S. PATENT DOCUMENTS

| 3,224,908 A | 12/1965 | Duch et al. |
| 3,293,088 A | 12/1966 | Herbst et al. |
| 3,313,783 A | 4/1967 | Iwakura et al. |
| 3,737,045 A | 6/1973 | Hasimoto et al. |
| 3,783,137 A * | 1/1974 | Gerber ............ 528/208 |
| 3,808,305 A | 4/1974 | Gregor |
| 4,012,303 A | 3/1977 | D'Agostino et al. |
| 4,075,093 A | 2/1978 | Walch et al. |
| 4,187,333 A | 2/1980 | Rembaum et al. |
| 4,537,668 A | 8/1985 | Gaussens et al. |
| 4,622,276 A | 11/1986 | Walsh |
| 4,634,530 A | 1/1987 | Kuder et al. |
| 5,098,985 A | 3/1992 | Harris et al. |
| 5,211,984 A | 5/1993 | Wilson |
| 5,218,076 A | 6/1993 | Madison et al. |
| 5,312,895 A | 5/1994 | Dang et al. |
| 5,492,996 A | 2/1996 | Dang et al. |
| 5,599,639 A | 2/1997 | Sansone et al. |
| 5,633,337 A | 5/1997 | Tan et al. |
| 5,643,968 A | 7/1997 | Andreola et al. |
| 5,656,386 A | 8/1997 | Scherer et al. |
| 5,674,969 A | 10/1997 | Sikkema et al. |
| 6,030,718 A | 2/2000 | Fuglevand et al. |
| 6,087,032 A | 7/2000 | Yoshitake et al. |
| 6,096,369 A | 8/2000 | Anders et al. |
| 6,110,616 A | 8/2000 | Sheikh-Ali et al. |
| 6,124,060 A * | 9/2000 | Akita et al. ............ 429/307 |
| 6,197,147 B1 | 3/2001 | Bönsel et al. |
| 6,248,469 B1 | 6/2001 | Formato et al. |
| 6,368,587 B1 | 4/2002 | Anders et al. |

(Continued)

FOREIGN PATENT DOCUMENTS

DE    196 53 484 A 1    6/1998

(Continued)

OTHER PUBLICATIONS

Innophos, "Polyphosphoric Acid Assay" http://www.innophos.com/brochures/Plphshrccdss/page1.asp.*

(Continued)

*Primary Examiner*—Gregg Cantelmo
*Assistant Examiner*—Eugenia Wang
(74) *Attorney, Agent, or Firm*—Hammer & Associates, P.C.

(57) ABSTRACT

A proton-conducting polymer membrane comprising polyazoles containing phosphonic acid groups is obtainable by a process comprising:
A) mixing one or more aromatic or heteroaromatic tetraamino compounds with one or more aromatic or heteroaromatic carboxylic acids or derivatives thereof which contain at least two acid groups per carboxylic acid monomer, with at least part of the tetraamino compounds or the carboxylic acids comprising at least one phosphonic acid group, or mixing of one or more aromatic or heteroaromatic diaminocarboxylic acids, of which at least part comprises phosphonic acid groups, in polyphosphoric acid to form a solution or dispersion;
B) optionally heating the solution or dispersion obtained by step A) under inert gas to temperatures of up to 350° C. to form polyazole polymers;
C) applying a layer using the mixture from step A) or B) to a support, thus forming a membrane, and
D) partially hydrolyzing the polyphosphoric acid moieties of the membrane from step C) until it is self-supporting.

29 Claims, No Drawings

U.S. PATENT DOCUMENTS

| | | | |
|---|---|---|---|
| 6,767,585 B2 * | 7/2004 | Kerres et al. | 427/350 |
| 2001/0003130 A1 * | 6/2001 | Matsuoka et al. | 528/183 |
| 2001/0038937 A1 | 11/2001 | Suzuki et al. | |
| 2002/0045085 A1 | 4/2002 | Formato et al. | |
| 2004/0062969 A1 * | 4/2004 | Sakaguchi et al. | 429/33 |
| 2004/0101731 A1 | 5/2004 | Jakoby et al. | |
| 2005/0256296 A1 * | 11/2005 | Kiefer et al. | 528/327 |

FOREIGN PATENT DOCUMENTS

| | | | |
|---|---|---|---|
| DE | 101 48 131 A1 | | 5/2003 |
| EP | 0 476 560 A1 | | 3/1992 |
| EP | 0 846 733 A2 | | 6/1998 |
| EP | 0 893 165 A2 | | 1/1999 |
| EP | 1 110 992 A1 | | 6/2001 |
| EP | 1 202 365 A1 | | 5/2002 |
| EP | 1354907 A1 | | 10/2003 |
| JP | 53-97988 | | 8/1978 |
| JP | 2002146014 | | 5/2002 |
| JP | 2002146016 A | * | 5/2002 |
| JP | 2003022709 | | 1/2003 |
| WO | WO 99/10165 | | 3/1999 |
| WO | WO 00/49069 | | 8/2000 |
| WO | WO 00/54351 | | 9/2000 |
| WO | WO 01/45192 A1 | | 6/2001 |
| WO | WO 01/94450 A2 | | 12/2001 |
| WO | WO 02/36249 A1 | | 5/2002 |
| WO | WO 0238650 A1 | | 5/2002 |
| WO | WO 02/071518 A1 | | 9/2002 |
| WO | WO 02/081547 A1 | | 10/2002 |
| WO | WO 02/088219 A1 | | 11/2002 |
| WO | WO 02/102881 A1 | | 12/2002 |
| WO | WO 03/007411 A2 | | 1/2003 |
| WO | WO 03/022412 A2 | | 3/2003 |
| WO | WO 03/022412 A3 | | 3/2003 |
| WO | WO-2004024797 | * | 3/2004 |

OTHER PUBLICATIONS

Machine Translation of JP 2002-146016 A, relied upon within the action.*

Database Caplus, American Chemical Society: XP002270164 retrieved from STN Database accession No. 2002:378564, Abstract of JP 2002 146014 A (Toyobo Co. Ltd.); May 22, 2002.

Database Caplus, American Chemical Society: XP002270471 retrieved from STN Database accession No. 2003:56631, Abstract of JP 2003 022709 A (Toyobo Co. Ltd.); Jan. 24, 2003.

Polymeric Materials Science and Engineering, Y. Sakaguchi et al., vol. 84, 2001, p. 899-900.

Y. Sakaguchi, et al., "Preparation and Properties of Sulfonated or Phosphonated Polybenzimidazoles and Polybenzoxazoles," *Am. Chem. Soc., Polymeric Materials Science and Engineering*, 84: 899-900 (2001).

Spry, R. J., et al. Anisotropic Ionic Conductivity of Lithium-Doped Sulfonated PBI, *J. Of Polymer Sci.: Part B: Polymer Physics*, 35: 2925-2933 (1997).

Osaheni, J. A. and Jenekhe, S. A., "Synthesis and Processing of Heterocyclic Polymers as Electronic, Optoelectronic, and Nonlinear Optical Materials. 4. New Conjugated Rigid-Rod Poly(benzobis(imidazole))s," *Macromolecules* 28:1172-1179 (1995).

* cited by examiner

PROTON CONDUCTING POLYMER MEMBRANE COMPRISING PHOSPHONIC ACID GROUPS CONTAINING POLYAZOLES AND THE USE THEREOF IN FUEL CELLS

RELATED APPLICATIONS

This application is the U.S. National Stage of International Application No. PCT/EP2003/010906, filed Oct. 2, 2003, published in German, and claims priority under 35 U.S.C. § 119 or 365 to German Application No. 102 46 459.6, filed Oct. 4, 2002.

BACKGROUND OF THE INVENTION

1. Field of the Invention

The present invention relates to a proton-conducting polymer electrolyte membrane which comprises polyazoles containing phosphonic acid groups and can, owing to its excellent chemical and thermal properties, be used for a variety of purposes and is particularly useful as polymer electrolyte membrane (PEM) in PEM fuel cells.

2. Description of Related Art

A fuel cell usually comprises an electrolyte and two electrodes separated by the electrolyte. In the case of a fuel cell, a fuel such as hydrogen gas or a methanol/water mixture is supplied to one of the two electrodes and an oxidant such as oxygen gas or air is supplied to the other electrode and chemical energy from the oxidation of the fuel is in this way converted directly into electric energy. The oxidation reaction forms protons and electrons.

The electrolyte is permeable to hydrogen ions, i.e. protons, but not to reactive fuels such as the hydrogen gas or methanol and the oxygen gas.

A fuel cell generally comprises a plurality of single cells known as membrane-electrode units (MEUs) which each comprise an electrolyte and two electrodes separated by the electrolyte.

Electrolytes employed for the fuel cell are solids such as polymer electrolyte membranes or liquids such as phosphoric acid. Recently, polymer electrolyte membranes have attracted attention as electrolytes for fuel cells. In principle, a distinction can be made between two categories of polymer membranes.

The first category encompasses cation-exchange membranes comprising a polymer framework containing covalently bound acid groups, preferably sulfonic acid groups. The sulfonic acid group is converted into an anion with release of a hydrogen ion and therefore conducts protons. The mobility of the proton and thus the proton conductivity is linked directly to the water content. Due to the very good miscibility of methanol and water, such cation-exchange membranes have a high methanol permeability and are therefore unsuitable for use in a direct methanol fuel cell. If the membrane dries, e.g. as a result of a high temperature, the conductivity of the membrane and consequently the power of the fuel cell decreases drastically. The operating temperatures of fuel cells containing such cation-exchange membranes are thus limited to the boiling point of water. Moistening of the membranes represents a great technical challenge for the use of polymer electrolyte membrane fuel cells (PEMFCs) in which conventional, sulfonated membranes such as Nafion are used.

Materials used for polymer electrolyte membranes are thus, for example, perfluorosulfonic acid polymers. The perfluorosulfonic acid polymer (e.g. Nafion) generally has a perfluorinated hydrocarbon skeleton such as a copolymer of tetrafluoroethylene and trifluorovinyl and a side chain bearing a sulfonic acid group, e.g. a side chain bearing a sulfonic acid group bound to a perfluoroalkylene group, bound thereto.

The cation-exchange membranes are preferably organic polymers having covalently bound acid groups, in particular sulfonic acid. Processes for the sulfonation of polymers are described in F. Kucera et al., Polymer Engineering and Science 1988, Vol. 38, No. 5, 783-792.

The most important types of cation-exchange membranes which have achieved commercial importance for use in fuel cells are listed below: The most important representative is the perfluorosulfonic acid polymer Nafion® (U.S. Pat. No. 3,692,569). This polymer can, as described in U.S. Pat. No. 4,453,991, be brought into solution and then used as ionomer. Cation-exchange membranes are also obtained by filling a porous support material with such an ionomer. As support material, preference is given to expanded Teflon (U.S. Pat. No. 5,635,041).

A further perfluorinated cation-exchange membrane can be produced as described in U.S. Pat. No. 5,422,411 by copolymerization of trifluorostyrene and sulfonyl-modified trifluorostyrene. Composite membranes comprising a porous support material, in particular expanded Teflon, filled with ionomers consisting of such sulfonyl-modified trifluorostyrene copolymers are described in U.S. Pat. No. 5,834,523. U.S. Pat. No. 6,110,616 describes copolymers of butadiene and styrene and their subsequent sulfonation to produce cation-exchange membranes for fuel cells.

A further class of partially fluorinated cation-exchange membranes can be produced by radiation grafting and subsequent sulfonation. Here, a grafting reaction, preferably using styrene, is carried out as described in EP667983 or DE19844645 on a previously irradiated polymer film. The side chains are then sulfonated in a subsequent sulfonation reaction. A crosslinking reaction can be carried out simultaneously with the grafting reaction and the mechanical properties can be altered in this way.

Apart from the above membranes, a further class of non-fluorinated membranes obtained by sulfonation of high-temperature-stable thermoplastics has been developed. Thus, membranes comprising sulfonated polyether ketones (DE 4219077, EP 96/01177), sulfonated polysulfone (J. Membr. Sci. 83 (1993) p. 211) or sulfonated polyphenylene sulfide (DE 19527435) are known. Ionomers prepared from sulfonated polyether ketones are described in WO 00/15691.

Further known membranes include acid-base blend membranes which are prepared as described in DE 19817374 or WO 01/18894 by mixing sulfonated polymers and basic polymers.

To improve the membrane properties further, a cation-exchange membrane known from the prior art can be mixed with a high-temperature-stable polymer. The production and properties of cation-exchange membranes comprising blends of sulfonated PEK and a) polysulfones (DE 4422158), b) aromatic polyamides (DE 42445264) or c) polybenzimidazole (DE 19851498) have been described.

However, a problem associated with such membranes is their complicated and thus expensive production, since it is usually necessary firstly to form different polymers which are subsequently cast, frequently with the aid of a solvent, to produce a film. To prepare the sulfonated polymers, it is usual to dissolve the PEK in a suitable solvent and subsequently react it with an aggressive sulfonating reagent, for example oleum or chlorosulfonic acid. This reaction is relatively critical, since the sulfonating reagent is a strong oxidant, so that degradation of the PEK cannot be ruled out. This would, in particular, have an adverse effect on the mechanical properties of the polymer. In a further process step, the sulfonated polymer is isolated and converted into the neutral form. The polymer then has to be brought back into solution. It is then possible, inter alia, to cast a polymer film from this solution. The solvent used for this purpose, for example N-dimethylacetamide, subsequently has to be removed. The process for producing such membranes is consequently complicated and thus expensive.

Uncontrolled sulfonation at many points on the polymer takes place in these sulfonation processes using very strong sulfonating agents. The sulfonation can also lead to chain rupture and thus to a worsening of the mechanical properties and finally to premature failure of the fuel cells.

Sulfonated polybenzimidazoles are also known from the literature. Thus, U.S. Pat. No. 4,634,530 describes a sulfonation of an undoped polybenzimidazole film with a sulfonating agent such as sulfuric acid or oleum in the temperature range up to 100° C.

Furthermore, Staiti et al., (P. Staiti in J. Membr. Sci. 188 (2001) 71), have described the preparation and properties of sulfonate polybenzimidazole. In this case, it was not possible to carry out the sulfonation of the polymer in the solution. Addition of the sulfonating agent to the PBI/DMAc solution results in precipitation of the polymer. To carry out the sulfonation, a PBI film was produced first and this was dipped into a dilute sulfuric acid. The samples were then treated at temperatures of about 475° C. for 2 minutes to effect sulfonation. The sulfonated PBI membranes have a maximum conductivity of only $7.5*10^{-5}$ S/cm at a temperature of 160° C. The maximum ion-exchange capacity is 0.12 meq/g. It was likewise shown that PBI membranes sulfonated in this way are not suitable for use in a fuel cell.

The production of sulfoalkylated PBI membranes by reaction of a hydroxyethyl-modified PBI with a sulfone is described in U.S. Pat. No. 4,997,892. On the basis of this technology, it is possible to produce sulfopropylated PBI membranes (Sanui et al., in Polym. Adv. Techn. 11 (2000) 544). The proton conductivity of such membranes is $10^{-3}$ S/cm and is thus too low for applications in fuel cells in which 0.1 S/cm is sought.

A disadvantage of all these cation-exchange membranes is the fact that the membrane has to be moistened, the operating temperature is limited to 100° C. and the membranes have a high methanol permeability. The reason for these disadvantages is the conductivity mechanism of the membrane, with the transport of the protons being coupled to the transport of the water molecule. This is referred to as the "vehicle mechanism" (K. -D. Kreuer, Chem. Mater. 1996, 8, 610-641).

A second category which has been developed encompasses polymer electrolyte membranes comprising complexes of basic polymers and strong acids. Thus, WO 96/13872 and the corresponding U.S. Pat. No. 5,525,436 describe a process for producing a proton-conducting polymer electrolyte membrane, in which a basic polymer such as polybenzimidazole is treated with a strong acid such as phosphoric acid, sulfuric acid, etc.

J. Electrochem. Soc., volume 142, No. 7, 1995, pp. L121-L123, describes doping of a polybenzimidazole in phosphoric acid.

In the case of the basic polymer membranes known from the prior art, the mineral acid (usually concentrated phosphoric acid) used for achieving the necessary proton conductivity is usually introduced after shaping of the polyazole film. The polymer here serves as support for the electrolyte consisting of the highly concentrated phosphoric acid. The polymer membrane in this case fulfills further important functions; in particular it has to have a high mechanical stability and serve as separator for the two fuel cells mentioned at the outset.

A significant advantage of such a membrane doped with phosphoric acid is the fact that a fuel cell in which such a polymer electrolyte membrane is used can be operated at temperatures above 100° C. without the moistening of the fuel cell which is otherwise necessary. This is due to the ability of the phosphoric acid to transport protons without additional water by means of the Grotthus mechanism (K. -D. Kreuer, Chem. Mater. 1996, 8, 610-641).

The possibility of operation at temperatures above 100° C. results in further advantages for the fuel cell system. Firstly, the sensitivity of the Pt catalyst to impurities in the gas, in particular CO, is greatly reduced. CO is formed as by-product in the reforming of the hydrogen-rich gas comprising carbon-containing compounds, e.g. natural gas, methanol or petroleum spirit, or as intermediate in the direct oxidation of methanol. The CO content of the fuel typically has to be less than 100 ppm at temperatures of <100° C. However, at temperatures in the range 150-200° C., 10,000 ppm or more of CO can also be tolerated (N. J. Bjerrum et al., Journal of Applied Electrochemistry, 2001, 31, 773-779). This leads to significant simplifications of the upstream reforming process and thus to cost reductions for the total fuel cell system.

A great advantage of fuel cells is the fact that the electrochemical reaction converts the energy of the fuel directly into electric energy and heat. Water is formed as reaction product at the cathode. Heat is thus generated as by-product in the electrochemical reaction. In the case of applications in which only the electric power is utilized for driving electric motors, e.g. in automobile applications, or as replacement for battery systems in many applications, the heat has to be removed in order to avoid overheating of the system. Additional, energy-consuming equipment is then necessary for cooling, and this further reduces the total electrical efficiency of the fuel cell. In the case of stationary applications such as central or decentralized generation of power and heat, the heat can be utilized efficiently by means of existing technologies, e.g. heat exchangers. High temperatures are sought here to increase the efficiency. If the operating temperature is above 100° C. and the temperature difference between ambient temperature and the operating temperature is large, it is possible to cool the fuel cell system more efficiently or employ small cooling areas and dispense with additional equipment compared to fuel cells which have to be operated at below 100° C. because of the moistening of the membrane.

However, besides these advantages, such a fuel cell system also has disadvantages. Thus, the durability of membranes doped with phosphoric acid is still in need of improvement. Here, the life is, in particular, significantly reduced by operation of the fuel cell below 100° C., for example at 80° C. However, it has to be noted in this context that the cell has to be operated at these temperatures during start-up and shut-down of the fuel cell.

The previously known acid-doped polymer membranes based on polyazoles display a favorable property profile. However, owing to the applications desired for PEM fuel cells, in particular in the automobile sector and in decentralized power and heat generation (stationary sector), these still need to be improved overall. Thus, the production of membranes doped with phosphoric acid is relatively expensive, since it is usual firstly to form a polymer which is subsequently cast with the aid of a solvent to produce a film. After the film has been dried, it is doped with an acid in a final step. The previously known polymer membranes therefore have a high content of dimethylacetamide (DMAc) which cannot be removed completely by means of known drying methods.

Furthermore, the performance, for example the conductivity, of known membranes is still in need of improvement.

BRIEF SUMMARY OF INVENTION

It is therefore an object of the present invention to provide a novel polymer electrolyte membrane which solves the abovementioned problems. In particular, a membrane according to the invention should be able to be produced inexpensively and simply. A further object of the present invention was to produce polymer electrolyte membranes which display high performance, in particular a high conductivity over a wide temperature range. The conductivity should be achieved without additional moistening, in particular at high temperatures.

Furthermore, the operation temperature should be able to be extended to the range from <80° C. to 200° C. without the life of the fuel cell being greatly reduced.

These objects are achieved by a proton-conducting polymer membrane comprising polyazoles containing phosphonic acid groups and having all the features of claim 1.

DETAILED DESCRIPTION OF INVENTION

A membrane according to the invention displays a high conductivity over a wide temperature range and this is achieved even without additional moistening. Furthermore, a membrane according to the invention can be produced simply and inexpensively. Thus, it is possible, in particular, to dispense with large amounts of expensive solvents such as dimethylacetamide.

Furthermore, these membranes have a surprisingly long life. Furthermore, a fuel cell equipped with a membrane according to the invention can also be operated at low temperatures, for example at 80° C., without the life of the fuel cell being greatly reduced thereby.

The present invention provides a proton-conducting polymer membrane which comprises polyazoles containing phosphonic acid groups and is obtainable by a process comprising the steps:

A) mixing one or more aromatic or heteroaromatic tetraamino compounds with one or more aromatic or heteroaromatic carboxylic acids or derivatives thereof which contain at least two acid groups per carboxylic acid monomer, with at least part of the tetraamino compounds or the carboxylic acids comprising at least one phosphonic acid group, or mixing of one or more aromatic or heteroaromatic diaminocarboxylic acids, of which at least part comprises phosphonic acid groups, in polyphosphoric acid to form a solution or dispersion;

B) heating the solution or dispersion obtained according to step A) under inert gas to temperatures of up to 350° C. to form polyazole polymers;

C) applying a layer using the mixture from step A) or B) to a support; and

D) treating the membrane from step C) until it is self-supporting.

The mixture prepared in step A) comprises monomers containing phosphonic acid groups for preparing polyazoles. Accordingly, either the tetraamino compounds necessary for preparing these polymers or the aromatic carboxylic acids having at least two carboxy groups can bear phosphonic acid groups. Furthermore, it is possible for both the tetraamino compounds and the aromatic carboxylic acids to have phosphonic acid groups. Here, the mixtures can further comprise tetraamino compounds and aromatic carboxylic acids which have no phosphonic acid groups.

Preferred aromatic and/or heteroaromatic tetraamino compounds having at least one phosphonic acid group generally correspond to the formula (A)

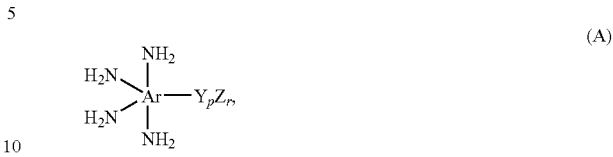

where
Ar is an aromatic or heteroaromatic group,
Y is a bond or a group having from 1 to 20 carbon atoms,
p is an integer from 1 to 4 and represents the number of bonds or groups Y via which the group Z is bound to the group Ar,
r is an integer from 1 to 4 and represents the number of groups Z which are bound to the group Y or, if Y is a bond, to the aromatic or heteroaromatic group Ar, and
Z is a group of the general formula (1)

$$-PO_3H_2 \quad (1)$$

or the general formula (2)

where $R^1$ is a hydrogen atom or a group having from 1 to 20 carbon atoms.

Apart from the free phosphonic acid compounds, the corresponding salts, for example the alkali metal salts, or the esters of phosphonic acids can also be added to the mixture. Preferred esters include, in particular, the C1-C6-alkyl esters of these compounds, for example the methyl and/or ethyl esters.

In a preferred embodiment of the present invention, Y is a bond, p and r are each 1 and Z corresponds to the formula (1). If Y is a bond, p is 1 and the group Z is bound directly to the aromatic or heteroaromatic group Ar. In this case, r represents the number of groups Z which are bound via a bond to the aromatic or heteroaromatic group Ar.

According to the invention, aromatic groups are radicals of monocyclic or polycyclic aromatic compounds which preferably have from 6 to 20, in particular from 6 to 12, carbon atoms. Heteroaromatic groups are aryl radicals in which at least one CH group has been replaced by N and/or at least two adjacent CH groups have been replaced by S, NH or O, with heteroaromatic groups having from 3 to 19 carbon atoms. Aromatic or heteroaromatic groups which are preferred for the purposes of the invention are derived from benzene, naphthalene, biphenyl, diphenyl ether, diphenylmethane, diphenyldimethylmethane, bisphenone, diphenyl sulfone, thiophene, furan, pyrrole, thiazole, oxazole, imidazole, isothiazole, isoxazole, pyrrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzoxathiadiazole, benzoxadiazole, benzopyridine, benzopyrazine, benzopyrazidine, benzopyrimidine, benzotriazine, indolizine, pyridopyridine, imidazopyrimidine, pyrazinopyrimidine, carbazole, acridine, phenazine, benzoquinoline, phenoxazine, phentothiazine, acridizine, benzopteridine, phenanthroline and phenanthrene, which may also be substituted.

The expression "group having from 1 to 20 carbon atoms" refers to radicals of organic compounds having from 1 to 20 carbon atoms. Apart from the aromatic and heteroaromatic groups which have been mentioned above, it encompasses, inter alia, alkyl, cycloalkyl, alkoxy, cycloalkoxy, cycloalkylthio, alkenyl, alkanoyl, alkoxycarbonyl groups and also heteroaliphatic groups. The groups mentioned can be branched or unbranched.

Preferred alkyl groups include the methyl, ethyl, propyl, isopropyl, 1-butyl, 2-butyl, 2-methylpropyl, tert-butyl radical, the pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and eicosyl group.

Preferred cycloalkyl groups include the cyclopropyl, cyclobutyl, cyclopentyl, cyclohexyl, cycloheptyl and cyclooctyl group, which may be substituted by branched or unbranched alkyl groups.

Preferred alkenyl groups include the vinyl, allyl, 2-methyl-2-propenyl, 2-butenyl, 2-pentenyl, 2-decenyl and 2-eicosenyl groups.

Preferred alkynyl groups include the ethynyl, propargyl, 2-methyl-2-propynyl, 2-butynyl, 2-pentynyl and 2-decynyl groups.

Preferred alkanoyl groups include the formyl, acetyl, propionyl, 2-methylpropionyl, butyryl, valeroyl, pivaloyl, hexanoyl, decanoyl and dodecanoyl groups.

Preferred alkoxycarbonyl groups include the methoxycarbonyl, ethoxycarbonyl, propoxycarbonyl, butoxycarbonyl, tert-butoxycarbonyl group, hexyloxycarbonyl, 2-methylhexyloxycarbonyl, decyloxycarbonyl or dodecyloxycarbonyl group.

Preferred alkoxy groups include alkoxy groups whose hydrocarbon radical is one of the abovementioned preferred alkyl groups.

Preferred cycloalkoxy groups include cycloalkoxy groups whose hydrocarbon radical is one of the abovementioned preferred cycloalkyl groups.

Preferred heteroaliphatic groups include the abovementioned preferred cycloalkyl radicals in which at least one carbon unit has been replaced by O, S or an $NR^2$ group and $R^2$ is hydrogen, an alkyl group having from 1 to 6 carbon atoms, an alkoxy group having from 1 to 6 carbon atoms or an aryl group.

Very particular preference is given according to the invention to branched or unbranched alkyl or alkoxy groups having from 1 to 20 carbon atoms, preferably from 1 to 12, advantageously from 1 to 6 and in particular from 1 to 4, carbon atoms and cycloalkyl or cycloalkyloxy groups having from 3 to 20 carbon atoms, preferably 5 or 6 carbon atoms.

Although one or more hydrogen atoms in the abovementioned radicals can be replaced by halogen atoms, preferably chlorine or fluorine, thiol or hydroxy groups or groups of the general formulae $NR^2R^3$ and $N^+R^2R^3R^4$, where the radicals $R^2$, $R^3$ and $R^4$ are each, independently of one another, hydrogen, an alkyl group having from 1 to 6 carbon atoms, an alkoxy group having from 1 to 6 carbon atoms or an aryl group, unsubstituted radicals have been found to be particularly advantageous.

These compounds include, inter alia, 3,3',4,4'-tetraaminobiphenyl-5-phosphonic acid, 3,3',4,4'-tetraaminobiphenyl-5,5'-diphosphonic acid, 3,4-diamino-5-sulfophenyl 3',4'-diaminophenyl sulfone, bis(3,4-diamino-5-sulfophenyl) sulfone, 3,4-diamino-5-sulfophenyl 3',4'-diaminophenyl ether and bis(3,4-diamino-5-sulfophenyl) ether.

Furthermore, the mixture can comprise aromatic and heteroaromatic tetraamino compounds containing sulfonic acid groups. Preferred aromatic and/or heteroaromatic tetraamino compounds containing at least one sulfonic acid group generally correspond to the formula (C)

(C)

where
Ar is an aromatic or heteroaromatic group,
Y is a bond or a group having from 1 to 20 carbon atoms,
p is an integer from 1 to 4 and represents the number of bonds or groups Y via which the group Z is bound to the group Ar,
r is an integer from 1 to 4 and represents the number of groups Z which are bound to the group Y or, if Y is a bond, to the aromatic or heteroaromatic group Ar, and
Z' is a group of the general formula (3)

—SO₃H     (3)

or the general formula (4)

(4)

where $R^1$ is a hydrogen atom or a group having from 1 to 20 carbon atoms.

Apart from the free sulfonic acid compounds, the corresponding salts, for example the alkali metal salts, or the esters of phosphonic acids can also be added to the mixture. Preferred esters include, in particular, the C1-C6-alkyl esters of these compounds, for example the methyl and/or ethyl esters.

In a preferred embodiment of the present invention, Y is a bond, p and r are each 1 and Z corresponds to the formula (1). Such compounds can be obtained particularly easily by sulfonation of known, generally commercially available, aromatics or heteroaromatics. If Y is a bond, p is 1 and the group Z is bound directly to the aromatic or heteroaromatic group Ar. In this case, r represents the number of groups Z which are bound via a bond to the aromatic or heteroaromatic group Ar.

The aromatic and heteroaromatic tetraamino compounds containing sulfonic acid groups include, inter alia, 3,3',4,4'-tetraaminobiphenyl-5-sulfonic acid, 3,3',4,4'-tetraaminobiphenyl-5,5'-disulfonic acid, 3,3',4,4'-tetraaminodiphenyl-5,-sulfonic acid, bis(3,4-diamino-5-sulfophenyl) sulfone, 3,4-diamino-5-sulfophenyl 3',4'-diaminophenyl ether and bis(3,4-diamino-5-sulfophenyl) ether.

Furthermore, the mixture can comprise aromatic and heteroaromatic tetraamino compounds containing no phosphonic acid groups. These include, inter alia, 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane and 3,3',4,4'-tetraaminodiphenyldimethylmethane and their salts, in particular their monohydrochloride, dihydrochloride, trihydrochloride and tetrahydrochloride derivatives. Among these, particular preference is given to 3,3',4,4'-tetraaminobiphenyl, 2,3,5,6-tetraaminopyridine and 1,2,4,5-tetraaminobenzene.

The mixture prepared in step A) can comprise aromatic and/or heteroaromatic carboxylic acids or derivatives thereof which contain phosphonic acid groups. These are, inter alia, dicarboxylic acids and tricarboxylic acids and tetracarboxylic acids or derivatives thereof. Preferred derivatives include, inter alia, the esters, in particular C1-C20-alkyl esters or C5-C12-aryl esters, the anhydrides or the acid halides, in particular the acid chlorides and/or the acid bromides.

Preferred aromatic and/or heteroaromatic carboxylic acids or derivatives thereof which contain at least two acid groups per carboxylic acid monomer generally correspond to the formula (B)

$$\text{XOC}-\underset{|}{\text{Ar}}-\text{COX,} \qquad Y_pZ_r \qquad (B)$$

where

Ar is an aromatic or heteroaromatic group which may bear further substituents, for example carboxylic acid groups or derivatives thereof, for example esters or carboxylic halides thereof, X is a halogen atom, for example chlorine, iodine or bromine, or a group of the formula $OR^2$, where $R^2$ is a hydrogen atom or a group having from 1 to 20 carbon atoms, Y is a bond or a group having from 1 to 20 carbon atoms, p is an integer from 1 to 4 and represents the number of bonds or groups Y via which the group Z is bound to the group Ar, r is an integer from 1 to 4 and represents the number of groups Z which are bound to the group Y or, if Y is a bond, to the aromatic or heteroaromatic group Ar, and Z is a group of the general formula (1)

$$-PO_3H_2 \qquad (1)$$

or the general formula (2)

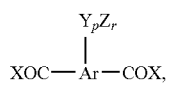

$$(2)$$

where $R^1$ is a hydrogen atom or a group having from 1 to 20 carbon atoms.

Apart from the free phosphonic acid compounds, the corresponding salts, for example the alkali metal salts, or the esters of phosphonic acids can also be added to the mixture. Preferred esters include, in particular, the C1-C6-alkyl esters of these compounds, for example the methyl and/or ethyl esters.

In a preferred embodiment of the present invention, Y is a bond, p and r are each 1 and Z corresponds to the formula (1).

Preferred aromatic dicarboxylic acids or derivatives thereof include, inter alia, 2,5-dicarboxyphenylphosphonic acid, 2,3-dicarboxyphenylphosphonic acid, 3,4-dicarboxyphenylphosphonic acid and 3,5-dicarboxyphenylphosphonic acid.

The mixture prepared in step A) can comprise aromatic and/or heteroaromatic carboxylic acids and derivatives thereof which contain sulfonic acid groups. These are, inter alia, dicarboxylic acids and tricarboxylic acids and tetracarboxylic acids or derivatives thereof. Preferred derivatives include, inter alia, the esters, in particular C1-C20-alkyl esters or C5-C12-aryl esters, the anhydrides or the acid halides, in particular the acid chlorides and/or the acid bromides.

Preferred aromatic and/or heteroaromatic carboxylic acids or derivatives thereof containing at least two acid groups per carboxylic acid monomer generally correspond to the formula (D)

where

Ar is an aromatic or heteroaromatic group which may bear further substituents, for example carboxylic acid groups or derivatives thereof, for example esters or carboxylic halides thereof, X is a halogen atom, for example chlorine, iodine or bromine, or a group of the formula $OR^2$, where $R^2$ is a hydrogen atom or a group having from 1 to 20 carbon atoms, Y is a bond or a group having from 1 to 20 carbon atoms, p is an integer from 1 to 4 and represents the number of bonds or groups Y via which the group Z is bound to the group Ar, r is an integer from 1 to 4 and represents the number of groups Z which are bound to the group Y or, if Y is a bond, to the aromatic or heteroaromatic group Ar, and Z' is a group of the general formula (3)

$$-SO_3H \qquad (3)$$

or the general formula (4)

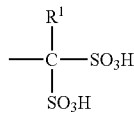

$$(4)$$

where $R^1$ is a hydrogen atom or a group having from 1 to 20 carbon atoms.

Apart from the free sulfonic acid compounds, the corresponding salts, for example the alkali metal salts, or the esters of phosphonic acids can also be added to the mixture. Preferred esters include, in particular, the C1-C6-alkyl esters of these compounds, for example the methyl and/or ethyl esters.

In a preferred embodiment of the present invention, Y is a bond, p and r are each 1 and Z corresponds to the formula (1). Such compounds can be obtained particularly easily by sulfonation of known, generally commercially available, aromatics or heteroaromatics.

Preferred aromatic dicarboxylic acids or derivatives thereof include, inter alia, 2,5-dicarboxyphenylsulfonic acid, 2,3-dicarboxyphenylsulfonic acid, 3,4-dicarboxyphenylsulfonic acid and 3,5-dicarboxyphenylsulfonic acid.

Furthermore, the mixture can comprise aromatic carboxylic acids which bear no phosphonic acid groups. These are dicarboxylic acids and tricarboxylic acids and tetracarboxylic acids and their esters or their anhydrides or their acid halides, in particular their acid halides and/or acid bromides. The aromatic dicarbocylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-dicarboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The aromatic tricarboxylic acids, or their C1-C20-alkyl esters or C5-C12-aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids which bear no phosphonic acid groups or their C1-C20-alkyl esters or C5-C12-aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3'4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids which bear no phosphonic acid groups are heteroaromatic dicarboxylic acids and tricarboxylic acids and tetracarboxylic acids or their esters or their anhydrides. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

The content of tricarboxylic acids or tetracarboxylic acids (based on dicarboxylic acid used) is from 0 to 30 mol %, preferably from 0.1 to 20 mol %, in particular from 0.5 to 10 mol %. These figures are based on the sum of carboxylic acids, regardless of the phosphonic acid content.

The aromatic and heteroaromatic diaminocarboxylic acids bearing at least one phosphonic acid group which are used according to the invention are preferably 2,3-diamino-5-carboxyphenylphosphonic acid, 2,3-diamino-6-carboxyphenylphosphonic acid and 3,4-diamino-6-carboxyphenylphosphonic acid.

Apart from the free phosphonic acid compounds, the corresponding salts, for example the alkali metal salts, or the esters of phosphonic acids can also be added to the mixture. Preferred esters include, in particular, the C1-C6-alkyl esters of these compounds, for example the methyl and/or ethyl esters.

Furthermore, the mixture to be prepared according to step A) can also comprise aromatic and heteroaromatic diaminocarboxylic acids which have at least one sulfonic acid group. These are preferably 2,3-diamino-5-carboxyphenylsulfonic acid, 2,3-diamino-6-carboxyphenylsulfonic acid and 3,4-diamino-6-carboxyphenylsulfonic acid.

Furthermore, the mixture can also comprise aromatic and heteroaromatic diaminocarboxylic acids which contain no phosphonic acid groups. These include, inter alia, diaminobenzoic acid, 4-phenoxycarbonylphenyl 3',4'-diaminophenyl ether and their monohydrochloride and dihydrochloride derivatives.

Preference is given to using mixtures of at least two different aromatic carboxylic acids in step A). Particular preference is given to using mixtures comprising not only aromatic carboxylic acids but also heteroaromatic carboxylic acids. The mixing ratio of aromatic carboxylic acids to heteroaromatic carboxylic acids is from 1:99 to 99:1, preferably from 1:50 to 50:1. These figures are independent of the phosphonic acid content of the carboxylic acids.

These mixtures are in particular mixtures of N-heteroaromatic dicarboxylic acids and aromatic dicarboxylic acids. Nonlimiting examples of dicarboxylic acids without a phosphonic acid group are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-dicarboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid. Carboxylic acids having phosphonic acid groups can be derived in a simple manner from the abovementioned compounds.

If a very high molecular weight is to be achieved, the molar ratio of carboxylic acid groups to amino groups in the reaction of tetraamino compounds with one or more aromatic carboxylic acids or esters thereof which contain at least two acid groups per carboxylic acid monomer is preferably in the vicinity of 1:2.

The mixture prepared in step A) preferably comprises at least 0.5% by weight, in particular from 1 to 30% by weight and particularly preferably from 2 to 15% by weight, of monomers for preparing polyazoles.

The content of monomers containing phosphonic acid groups, based on all monomers which serve for the preparation of polyazoles, is generally in the range from 0.5 to 100% by weight, preferably from 2 to 80% by weight, particularly preferably from 5 to 50% by weight, without this constituting a restriction. Particular preference is given to mixtures comprising both carboxylic acids containing phosphonic acid groups and having at least two carboxylic acid groups and tetraamino compounds without phosphonic acid groups.

The content of monomers containing sulfonic acid, based on all monomers which serve for the preparation of polyazoles, is generally in the range from 0 to 99% by weight, preferably from 2 to 50% by weight, particularly preferably from 10 to 40% by weight, without this constituting a restriction.

In a particular embodiment of the present invention, the molar ratio of phosphorus to nitrogen (P/N ratio), based on the polyazoles obtainable according to step B), is from 0.02 to 0.5, preferably from 0.05 to 0.35 and very particularly preferably from 0.07 to 0.25, without this constituting a restriction. The P/N ratio can be determined by means of elemental analysis.

In a particular embodiment of the present invention, the molar ratio of sulfur to nitrogen (S/N ratio), based on the polyazoles obtainable according to step B), is from 0.02 to 2, preferably from 0.05 to 1 and very particularly preferably from 0.07 to 0.25, without this constituting a restriction. The S/N ratio can be determined by means of element analysis.

In a particular embodiment of the present invention, the molar ratio of sulfur to phosphorus (S/P ratio), based on the polyazoles obtainable according to step B), is from 0 to 10, preferably from 0.1 to 5 and very particularly preferably from 0.2 to 4, without this constituting a restriction. The S/P ratio can be determined by means of elemental analysis.

The polyphosphoric acid used in step A) is a commercial polyphosphoric acid as can be obtained, for example, from Riedel-de Haen. The polyphosphoric acids $H_{n+2}P_nO_{3n+1}$ (n>1) usually have an assay calculated as $P_2O_5$ (acidimetric) of at least 83%. In place of a solution of the monomers, it is also possible to produce a dispersion/suspension.

In a preferred embodiment of the present invention, a mixture comprising at least one aromatic carboxylic acid containing phosphonic acid groups and at least one amino compound without phosphonic acid groups is formed in step A). If such a mixture is used, the polyazole containing phosphonic acid groups which is formed in step B) comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII).

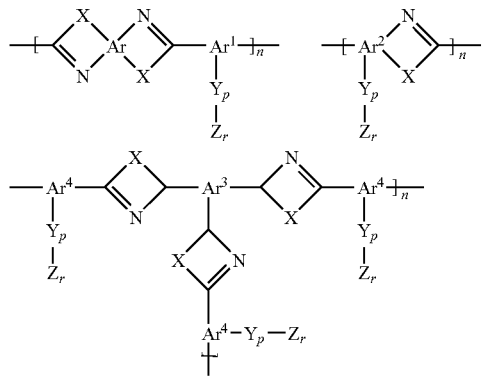

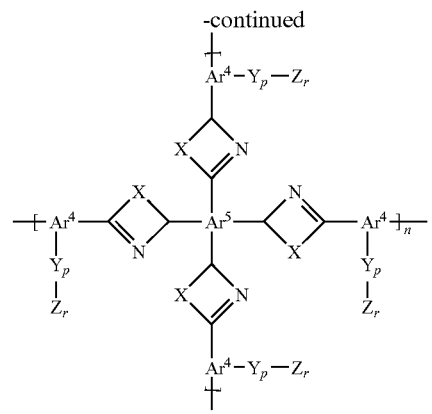

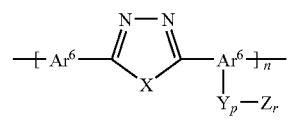
(V)

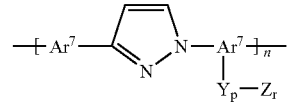
(VI)

(VII)

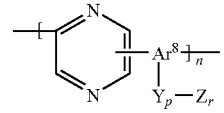
(VIII)

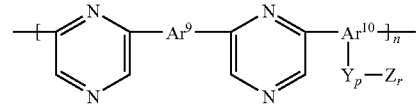
(IX)

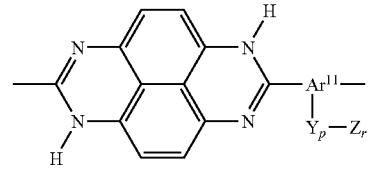
(X)

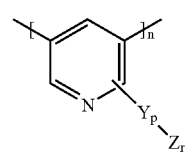
(XVI)

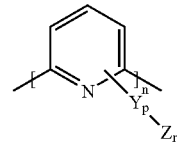
(XVII)

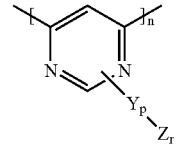
(XVIII)

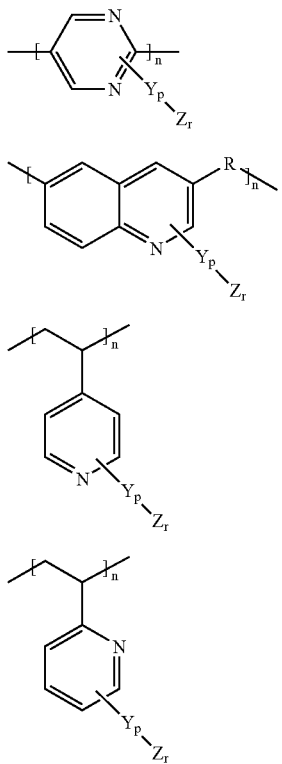

(XIX)

(XX)

(XXI)

(XXII)

wherein:

the radicals Ar are identical or different and are each a tetravalent aromatic or heteroaromatic group which can be monocyclic or polycyclic;

the radicals $Ar^1$ are identical or different and are each a divalent aromatic or heteroaromatic group which can be monocyclic or polycyclic;

the radicals $Ar^2$ are identical or different and are each a divalent or trivalent aromatic or heteroaromatic group which can be monocyclic or polycyclic;

the radicals $Ar^3$ are identical or different and are each a trivalent aromatic or heteroaromatic group which can be monocyclic or polycyclic;

the radicals $Ar^4$ are identical or different and are each a trivalent aromatic or heteroaromatic group which can be monocyclic or polycyclic;

the radicals $Ar^5$ are identical or different and are each a tetravalent aromatic or heteroaromatic group which can be monocyclic or polycyclic;

the radicals $Ar^6$ are identical or different and are each a divalent aromatic or heteroaromatic group which can be monocyclic or polycyclic;

the radicals $Ar^7$ are identical or different and are each a divalent aromatic or heteroaromatic group which can be monocyclic or polycyclic;

the radicals $Ar^8$ are identical or different and are each a trivalent aromatic or heteroaromatic group which can be monocyclic or polycyclic;

the radicals $Ar^9$ are identical or different and are each a divalent or trivalent or tetravalent aromatic or heteroaromatic group which can be monocyclic or polycyclic;

the radicals $Ar^{10}$ are identical or different and are each a divalent or trivalent aromatic or heteroaromatic group which can be monocyclic or polycyclic;

the radicals $Ar^{11}$ are identical or different and are each a divalent aromatic or heteroaromatic group which can be monocyclic or polycyclic;

the radicals X are identical or different and are each oxygen, sulfur or an amino group which bears a hydrogen atom, a group having 1-20 carbon atoms, preferably a branched or unbranched alkyl or alkoxy group, or an aryl group as further radical;

the radicals R are identical or different and are each hydrogen, an alkyl group or an aromatic group;

n, m are each an integer greater than or equal to 10, preferably greater than or equal to 100;

Y is a bond or a group having from 1 to 20 carbon atoms;

p is independently an integer from 1 to 4 and represents the number of bonds or groups Y via which the group Z is bound to the aromatic or heteroaromatic group;

r is independently an integer from 1 to 4 and represents the number of groups Z which are bound to the group Y or, if Y is a bond, to the aromatic or heteroaromatic group Ar; and Z is a group of the general formula (1):

$$-PO_3H_2 \qquad (1)$$

or the general formula (2):

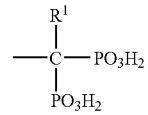

(2)

where $R^1$ is a hydrogen atom or a group having from 1 to 20 carbon atoms.

Here, the indices n and m which indicate the number of recurring units encompass recurring units which have not phosphonic acid groups.

The terms "aromatic or heteroaromatic group" and "group having from 1 to 20 carbon atoms" have been defined above.

$Ar^1$, $Ar^4$, $Ar^6$, $Ar^7$, $Ar^8$, $Ar^9$, $Ar^{10}$, $Ar^{11}$ can have any substitution pattern; in the case of phenylene, $Ar^1$, $Ar^4$, $Ar^6$, $Ar^7$, $Ar^8$, $Ar^9$, $Ar^{10}$, $Ar^{11}$ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further, preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole comprising only units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

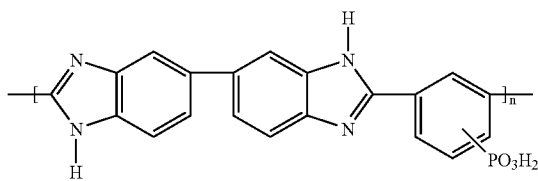
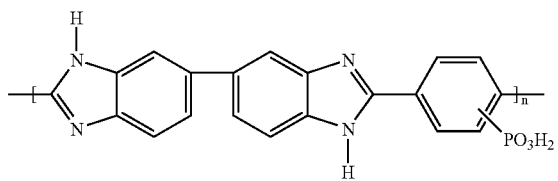
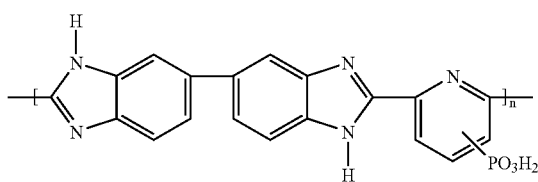
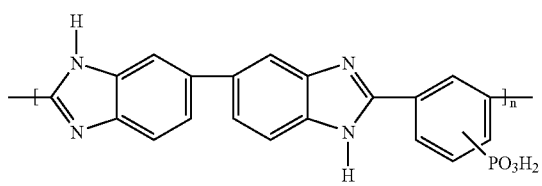
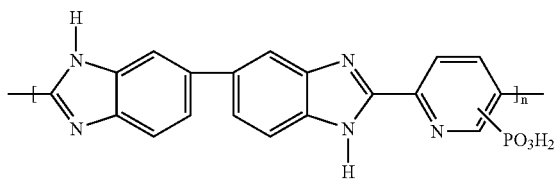
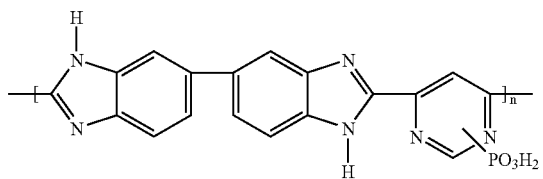
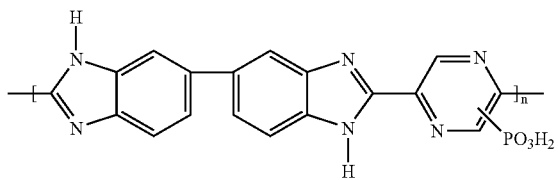
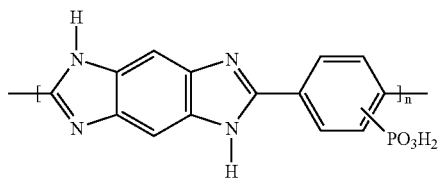
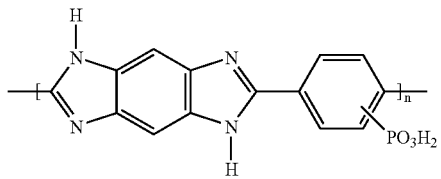
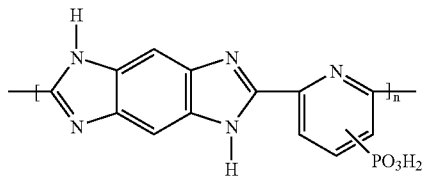
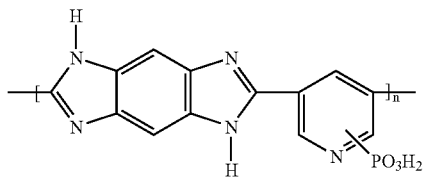
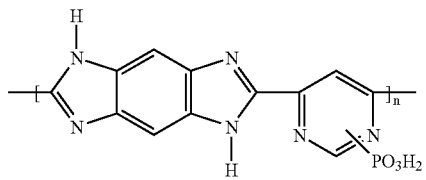
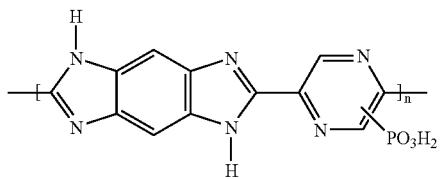
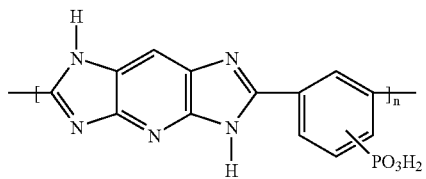

-continued

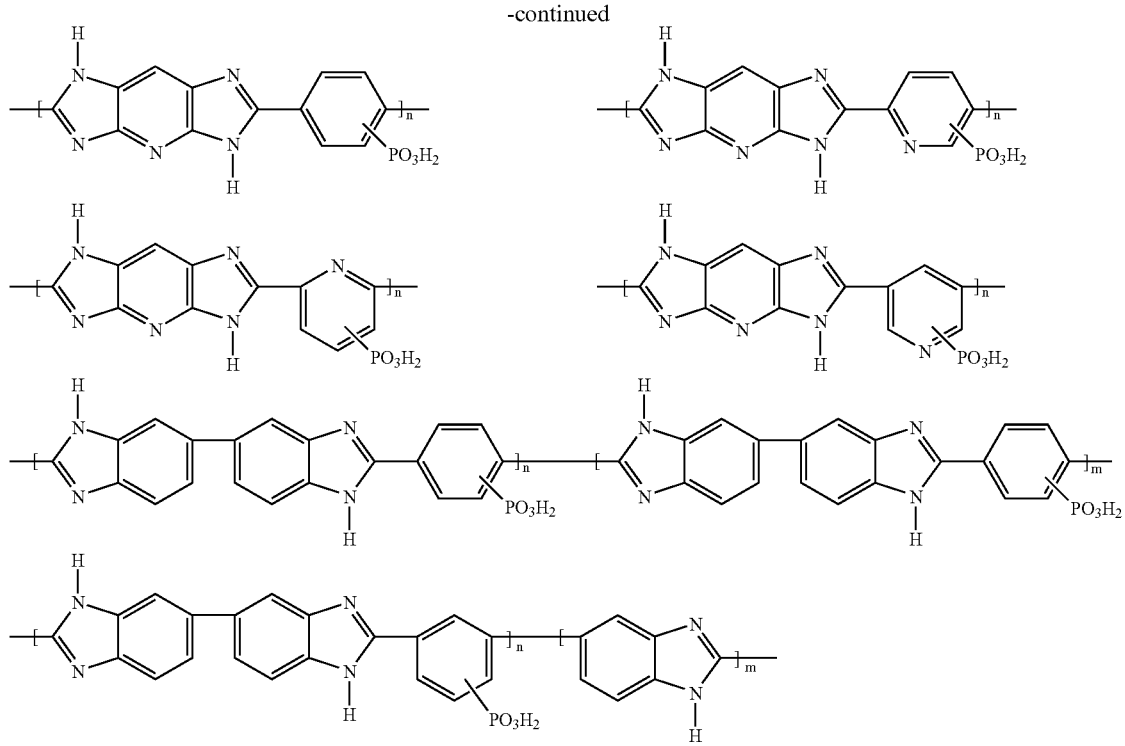

where n and m are each an integer greater than or equal to 10, preferably greater than or equal to 100. Here, the indices n and m which indicate the number of recurring units also encompass recurring units which have no phosphonic acid groups. These units are formed by a polymerization reaction of monomers, in particular aromatic carboxylic acids having at least two acid groups, in which no phosphonic acid group is present.

The polyazoles obtainable by means of the process described, but in particular the polybenzimidazoles, have a high molecular weight. Measured as intrinsic viscosity, it is in the range from 0.3 to 10 dl/g, preferably from 1 to 5 dl/g.

If tricarboxylic acids or tetracarboxylic acids are present in the mixture obtained in step A), they effect branching/crosslinking of the polymer formed. This contributes to an improvement in the mechanical properties.

In step B), the mixture obtained in step A) is heated at a temperature of up to 350° C., preferably up to 280° C., in particular from 100° C. to 250° C. and particularly preferably in the range from 200° C. to 250° C. An inert gas, for example nitrogen or a noble gas such as neon or argon, is used in this treatment.

Furthermore, it has been found that when using aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, the temperature in step B) is advantageously in the range up to 300° C., preferably in the range from 100° C. to 250° C. These temperature ranges also apply in the case of the corresponding carboxylic acids containing phosphonic acid groups.

In one variant of the process, the heating according to step B) can be carried out after the formation of a sheet-like structure according to step C).

The mixture prepared in step A) and/or B) can further comprise organic solvents. These can have a positive influence on the processability. Thus, for example, the rheology of the solution can be improved so that it can be extruded or spread by means of a doctor blade more easily.

The mixture produced in step A) and/or B) can also comprise dissolved, dispersed or suspended polymer. Such polymers can also be added to the mixture after step B).

Preferred polymers include, inter alia, polyolefins such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with sulfonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular ones derived from norbornene, polymers having C—O bonds in the main chain, for example polyacetal, polyoxymethylene, polyethers, polypropylene oxide, polyepichlorohydrin, polytetrahydrofuran, polyphenylene oxide, polyether ketone, polyesters, in particular polyhydroxyacetic acid, polyethylene terephthalate, polybutylene terephthalate, polyhydroxybenzoate, polyhydroxypopionic acid, polypivalolactone, polycaprolactone, polymalonic acid, polycarbonate; polymers having C—S bonds in the main chain, for example polysulfide ethers, polyphenylene sulfide, polyether sulfone; polymers having C—N bonds in the main chain, for example polyimines, polyisocyanides, polyetherimine, polyaniline, polyamides, polyhydrazides, polyurethanes, polyimides, polyazoles, polyazines; liquid-crystalline polymers, in particular Vectra, and inorganic polymers, for example polysilanes, polycarbosilanes, polysiloxanes, polysilicic acid, polysilicates, silicones, polyphosphazenes and polythiazyl.

Furthermore, the mixture produced in step A) and/or step B) can further comprise polymers having covalently bound acid groups. These polymers can also be added to the mixture after step B). These acid groups encompass, in particular, sulfonic acid groups. The polymers modified with sulfonic acid groups preferably have a content of sulfonic acid groups in the range from 0.5 to 3 meq/g. This value is determined via the ion exchange capacity (IEC).

To measure the IEC, the sulfonic acid groups are converted into the free acid. For this purpose, the polymer is treated with acid in a known manner, and excess acid is removed by washing. Thus, the sulfonated polymer is firstly treated in boiling water for 2 hours. Excess water is subsequently dabbed off and the sample is dried at 160° C. in a vacuum drying oven at p<1 mbar for 15 hours. The dry weight of the membrane is then determined. The polymer which has been dried in this way is then dissolved in DMSO at 80° C. over a period of 1 hour. The solution is subsequently titrated with 0.1 M NaOH. The ion exchange capacity (IEC) is then calculated from the consumption of acid to the equivalence point and the dry weight.

Such polymers are known to those skilled in the art. Thus, polymers containing sulfonic acid groups can be prepared, for example, by sulfonation of polymers. Processes for the sulfonation of polymers are described in F. Kucera et al., Polymer Engineering and Science 1988, Vol. 38, No. 5, 783-792. The sulfonation conditions here can be selected so that a low degree of sulfonation results (DE-A-19959289).

A further class of nonfluorinated polymers has been developed by sulfonation of high-temperature-stable thermoplastics. Thus, sulfonated polyether ketones (DE-A-4219077, WO96/01177), sulfonated polysulfones (J. Membr. Sci. 83 (1993) p. 211) or sulfonated polyphenylene sulfide (DE-A-19527435) are known.

U.S. Pat. No. 6,110,616 describes copolymers of butadiene and styrene and their subsequent sulfonation for use in fuel cells.

Furthermore, such polymers can also be obtained by polymerization reactions of monomers comprising acid groups. Thus, perfluorinated monomers can be prepared as described in U.S. Pat. No. 5,422,411 by copolymerization of trifluorostyrene and sulfonyl-modified trifluorostyrene.

These perfluorosulfonic acid polymers include, inter alia, Nafion® (U.S. Pat. No. 3,692,569). This polymer can, as described in U.S. Pat. No. 4,453,991, be brought into solution and then used as ionomer.

Preferred polymers having acid groups include, inter alia, sulfonated polyether ketones, sulfonated polysulfones, sulfonated polyphenylene sulfides, perfluorinated polymers containing sulfonic acid groups, as described in U.S. Pat. Nos. 3,692,569, 5,422,411 and 6,110,616.

To achieve a further improvement in the use properties, fillers, in particular proton-conducting fillers, and additional acids can also be added to the membrane. The addition can be carried out, for example, in step A), step B) and/or step C). Furthermore, these additives can, if they are in liquid form, also be added after the polymerization in step D).

Nonlimiting examples of proton-conducting fillers are:

sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$;

phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$;

polyacids such as $H_3PW_{12}O_{40} \cdot nH_2O$ (n=21-29), $H_3SiW_{12}O_{40} \cdot nH_2O$ (n=21-29), H, $WO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$;

selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$;

phosphides such as ZrP, TiP, HfP;

oxides such as $Al_2O_3$, $Sb_2O_5$, $ThO_2$, $SnO_2$, $ZrO_2$, $MoO_3$;

silicates such as zeolites, zeolites($NH_4+$), sheet silicates, framework silicates, H-natrolites, H-mordenites, $NH_4$-analcines, $NH_4$-sodalites, $NH_4$-gallates, H-montmorillonites;

acids such as $HClO_4$, $SbF_5$;

fillers such as carbides, in particular SiC, $Si_3N_4$, fibers, in particular glass fibers, glass powders and/or polymer fibers, preferably ones based on polyazoles.

These additives can be present in the proton-conducting polymer membrane in customary amounts, but the positive properties such as high conductivity, long life and high mechanical stability of the membrane should not be impaired too much by addition of excessively large amounts of additives. In general, the membrane after the treatment according to step D) comprises not more than 80% by weight, preferably not more than 50% by weight and particularly preferably not more than 20% by weight, of additives.

In addition, this membrane can further comprise perfluorinated sulfonic acid additives (preferably 0.1-20% by weight, more preferably 0.2-15% by weight, very particularly preferably 0.2-10% by weight). These additives lead to an increase in power, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl, D.; Singh, S. Case Cent. Electrochem. Sci., Case West, Reserve Univ., Cleveland, Ohio, USA. J. Electrochem. Soc. (1989), 136(2), 385-90.) Nonlimiting examples of perfluorinated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perflorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

The formation of the sheet-like structure according to step C) is carried out by means of measures known per se from the prior art for polymer film production (casting, spraying, spreading by means of a doctor blade, extrusion). Suitable supports are all supports which are inert under the conditions. These supports include, in particular, films of polyethylene terephthalate (PET), polytetrafluoroethylene (PTFE), polyhexafluoropropylene, copolymers of PTFE with hexafluoropropylene, polyimides, polyphenylene sulfides (PPS) and polypropylene (PP).

To adjust the viscosity, the solution can, if appropriate, be admixed with a volatile organic solvent. The viscosity can in this way be set to the desired value and the formation of the membrane can be made easier.

The thickness of the sheet-like structure obtained in step C) is preferably from 10 to 4000 µm, more preferably from 15 to 3500 µm, in particular from 20 to 3000 µm, particularly preferably from 30 to 1500 µm and very particularly preferably from 50 to 1200 µm.

The treatment of the membrane in step D) is carried out, in particular, at temperatures in the range from 0° C. to 150° C., preferably at temperatures of from 10° C. to 120° C., in particular from room temperature (20° C.) to 90° C., in the presence of moisture or water and/water vapor. The treatment is preferably carried out under atmospheric pressure, but can also be carried out under superatmospheric pressure. It is important that the treatment occurs in the presence of sufficient moisture, as a result of which the polyphosphoric acid present is partially hydrolyzed to form low molecular weight polyphosphoric acid and/or phosphoric acid and contributes to strengthening of the membrane.

The partial hydrolysis of the polyphosphoric acid in step D) leads to strengthening of the membrane and to a decrease in the layer thickness and formation of a membrane. The strengthened membrane generally has a thickness in the range from 15 to 3000 µm, preferably from 20 to 2000 µm, in particular from 20 to 1500 µm, with the membrane being self-supporting.

The strengthening of the membrane in step D) also results in an increase in its hardness, which can be determined by means of microhardness measurement in accordance with DIN 50539. For this purpose, the membrane is loaded with a Vickers diamond at an increasing force up to 3 mN over a period of 20 s and the penetration depth is determined. According to this, the hardness at room temperature is at least 5 mN/mm$^2$ and preferably at least 20 mN/mm$^2$, without this constituting a restriction. At these hardness values, the membranes are generally self-supporting. The force is subsequently kept constant at 3 mN for 5 s and the creep is calculated from the penetration depth. In the case of preferred membranes, the creep $C_{HU}$ 0.003/20/5 under these conditions is less than 30%, preferably less than 15% and very particularly preferably less than 5%. The modulus determined by means of microhardness measurement YHU is at least 0.1 MPa, in particular at least 2 MPa and very particularly preferably at least 5 MPa, without this constituting a restriction.

The upper temperature limit for the treatment according to step D) is generally 150° C. In the case of extremely brief action of moisture, for example of superheated steam, this steam can also be hotter than 150° C. The duration of the treatment is a critical factor in determining the upper temperature limit.

The partial hydrolysis (step D) can also be carried out in controlled temperature/humidity chambers in which the hydrolysis can be controlled in a targeted manner in the presence of a defined amount of moisture. The humidity can be set in a targeted manner by means of the temperature or by saturating the environment with which the membrane comes into contact, for example gases such as air, nitrogen, carbon dioxide or other suitable gases, with water vapor. The treatment time is dependent on the choice of the above parameters. Furthermore, the treatment time is dependent on the thickness of the membrane.

In general, the treatment time ranges from a few seconds to some minutes, for example under the action of superheated steam, or up to entire days, for example in air at room temperature at low relative atmospheric humidity. The treatment time is preferably in the range from 10 seconds to 300 hours, in particular from 1 minute to 200 hours.

If the partial hydrolysis is carried out at room temperature (20° C.) using ambient air having a relative atmospheric humidity of 40-80%, the treatment time is in the range from 1 to 200 hours.

The membrane obtained according to step D) can be self-supporting, i.e. it can be detached from the support without damage and may subsequently, if appropriate, be directly processed further.

The concentration of phosphoric acid and thus the conductivity of the polymer membrane of the invention can be set via the degree of hydrolysis, i.e. the time, temperature and ambient humidity. According to the invention, the concentration of the phosphoric acid is reported as mol of acid per mol of repeating units of the polymer. For the purposes of the present invention, a concentration (mol of phosphoric acid per mol of repeating units of the formula (III), i.e. polybenzimidazole) of from 10 to 80, in particular from 12 to 60, is preferred. Such high degrees of doping (concentrations) can be obtained only with great difficulty, if at all, by doping of polyazoles with commercially available ortho-phosphoric acid.

Subsequent to the treatment according to step D), the membrane can be additionally crosslinked by the action of heat in the presence of atmospheric oxygen. This hardening of the membrane achieves an additional improvement in the properties of the membrane. For this purpose, the membrane can be heated to a temperature of at least 150° C., preferably at least 200° C. and particularly preferably at least 250° C. The oxygen concentration in this process step is usually in the range from 5 to 50% by volume, preferably from 10 to 40% by volume, without this constituting a restriction.

Crosslinking can also be effected by action of IR or NIR (IR—infrared, i.e. light having a wavelength or more than 700 nm; NIR—near IR, i.e. light having a wavelength in the range from about 700 to 2000 nm or an energy in the range from about 0.6 to 1.75 eV). A further method is irradiation with β-rays. The radiation dose is in the range from 5 to 200 kGy.

Depending on the desired degree of crosslinking, the duration of the crosslinking reaction can vary over a wide range. In general, this reaction time is in the range from 1 second to 10 hours, preferably from 1 minute to 1 hour, without this constituting a restriction.

The polymer membrane of the invention displays improved materials properties compared to the previously known doped polymer membranes. In particular, it displays improved power compared to known doped polymer membranes. This is due, in particular, to an improved proton conductivity. At a temperature of 120° C., this is at least 0.1 S/cm, preferably at least 0.11 S/cm, in particular at least 0.12 S/cm. If the membranes of the invention comprise polyazoles having sulfonic acid groups, the membranes also display a high conductivity at a temperature of 70° C. The conductivity is dependent, inter alia, on the sulfonic acid group content of the polyazoles. The higher this content, the better the conductivity at low temperatures. A membrane according to the invention can be moistened at low temperatures. For this purpose, it is possible, for example, to provide the compound used as energy source, for example hydrogen, with a proportion of water. However, the water formed by the reaction is in many cases sufficient to achieve moistening.

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model comprising a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before commencement of the measurement.

Possible fields of use of the polymer membranes of the invention include, inter alia, use in fuel cells, in electrolysis, in capacitors and in battery systems.

The present invention also provides a membrane-electrode unit comprising at least one polymer membrane according to the invention. For further information on membrane-electrode units, reference may be made to the specialist literature, in particular the patents U.S. Pat. Nos. 4,191,618, 4,212,714 and 4,333,805. The disclosure of the abovementioned references [U.S. Pat. Nos. 4,191,618, 4,212,714 and 4,333,805] in respect of the structure and the production of membrane-electrode units and also the electrodes, gas diffusion layers and catalysts to be selected is incorporated by reference into the present description.

In one variant of the present invention, membrane formation can be carried out directly on the electrode rather than on a support. The treatment according to step D) can in this way be correspondingly shortened, since the membrane no longer has to be self-supporting. Such a membrane is also provided by the present invention.

The present invention further provides an electrode which comprises polyazoles containing phosphonic acid groups and is obtainable by a process comprising the steps:

A) mixing one or more aromatic or heteroaromatic tetraamino compounds with one or more aromatic or heteroaromatic carboxylic acids or derivatives thereof which contain at least two acid groups per carboxylic acid monomer, with at least part of the tetraamino compounds or the carboxylic acids comprising at least one phosphonic acid group, or mixing of one or more aromatic or heteroaromatic diaminocarboxylic acids, of which at least part comprises phosphonic acid groups, in polyphosphoric acid to form a solution or dispersion;

B) heating the solution or dispersion obtained according to step A) under inert gas to temperatures of up to 350° C. to form the polyazole polymer;

C) applying a layer using the mixture from step A) or B) to an electrode; and

D) treating the membrane formed in step C) until it has a surface hardness.

For the sake of completeness, it should be stated that all preferred embodiments of a self-supporting membrane also apply analogously to a membrane applied directly to the electrode.

In a particular embodiment of the present invention, the coating has a thickness of from 2 to 3000 μm, preferably from 2 to 2000 μm, in particular from 3 to 1500 μm, particularly preferably from 5 to 500 μm and very particularly preferably from 10 to 200 μm, without this constituting a restriction.

The treatment according to step D) leads to a hardening of the coating. The treatment is carried out until the coating has a hardness which is sufficient for it to be able to be pressed to form a membrane-electrode unit. A sufficient hardness is ensured when a membrane treated in this way is self-supporting. However, a lower hardness is sufficient in many cases. The hardness determined in accordance with DIN 50539 (microhardness measurement) is generally at least 1 mN/mm$^2$, preferably at least 5 mN/mm$^2$ and very particularly preferably at least 15 mN/mm$^2$, without this constituting a restriction.

An electrode which has been coated in this way can be installed in a membrane-electrode unit which, if appropriate, has at least one polymer membrane according to the invention.

In a further variant, a catalytically active layer can be applied to the membrane according to the invention and this layer can be joined to a gas diffusion layer. For this purpose, a membrane is formed according to steps A) to D) and the catalyst is applied. These structures are also provided by the present invention.

In addition, the formation of the membrane according to steps A) to D) can also be carried out on a support or a support film on which the catalyst is present. After removal of the support or the support film, the catalyst is present on the membrane according to the invention. These structures are also provided by the present invention.

The present invention likewise provides a membrane-electrode unit comprising at least one coated electrode and/or at least one polymer membrane according to the invention in combination with a further polymer membrane based on polyazoles or a polymer blend membrane comprising at least one polymer based on polyazoles.

EXAMPLE 1

90.98 g of polyphosoric acid were added to a mixture of 1.73387 g of isophthalic acid, 2.5707 g (0.010445 mol) of 3,5-dicarboxy-1-phenylphosphonic acid and 4.47 g of 3,3',4'-tetraaminobiphenyl in a flask while stirring under a nitrogen atmosphere. The mixture was polymerized at 200° C. for 20 hours. The solution was subsequently diluted with 11.09 g of 85% phosphoric acid. The solution was then applied by means of a doctor blade to a glass plate at elevated temperature and subsequently hydrolyzed.

Proton conductivity of phospho-PBI-co-PBI polymer electrolyte membrane: 120 mS/cm at 160° C.

The invention claimed is:

1. A proton-conducting polymer membrane which comprises polyazoles containing phosphonic acid groups and is obtainable by a process comprising the steps:

A) mixing one or more aromatic or heteroaromatic tetraamino compounds with one or more aromatic or heteroaromatic carboxylic compounds in polyphosphoric acid to form a solution or dispersion, wherein the carboxylic compounds contain at least two carboxylic groups selected from acids, esters, acid halides or acid anhydrides, with at least part of the tetraamino compounds or the carboxylic compounds comprising at least one phosphonic acid group; or mixing one or more aromatic or heteroaromatic diaminocarboxylic compounds in polyphosphoric acid to form a solution or dispersion wherein the diaminocarboxylic compounds contain a carboxylic group selected from acids and esters, wherein at least a part of said diaminocarboxylic compounds comprises phosphonic acid groups;

B) heating the solution or dispersion obtained according to step A) under inert gas to temperatures of up to 350° C. to form polyazole polymers; and C) applying a layer using the mixture from step B) to a support, thus forming a membrane on the support; or D) applying the solution or dispersion from step A) to a support, thus forming a membrane on the support; and E) heating the membrane formed in step D) under inert gas to temperatures of up to 325° C. to form polyazoles polymers; and F) partially hydrolyzing the polyphosphoric acid moieties of the membrane from step C) or step E) until the membrane is self-supporting, wherein the concentration of phosphoric acid in the membrane of step (F) is from 10 to 80 mols of phosphoric acid per mol of a repeating unit of the polyazole polymer.

2. The membrane of claim 1, characterized in that the mixture prepared in step A) comprises aromatic or heteroaromatic tetraamino compounds of the formula (A)

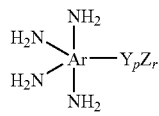
(A)

where
Ar is an aromatic or heteroaromatic group,
Y is a bond or a group having from 1 to 20 carbon atoms,
p is an integer from 1 to 4 and represents the number of bonds or groups Y via which the group Z is bound to the group Ar,
r is an integer from 1 to 4 and represents the number of groups Z which are bound to the group Y or, if Y is a bond, to the aromatic or heteroaromatic group Ar, and
Z is a group of the general formula (1)

(1)

or the general formula (2)

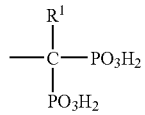
(2)

where $R^1$ is a hydrogen atom or a group having from 1 to 20 carbon atoms.

3. The membrane of claim 1, characterized in that the mixture prepared in step A) comprises aromatic or heteroaromatic carboxylic compounds of the formula (B)

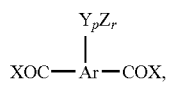
(B)

where
Ar is an aromatic or heteroaromatic group,
X is a halogen atom or a group of the formula $OR^2$, where $R^2$ is a hydrogen atom or a group having from 1 to 20 carbon atoms,
Y is a bond or a group having from 1 to 20 carbon atoms,
p is an integer from 1 to 4 and represents the number of bonds or groups Y via which the group Z is bound to the group Ar,
r is an integer from 1 to 4 and represents the number of groups Z which are bound to the group Y or, if Y is a bond, to the aromatic or heteroaromatic group Ar, and
Z is a group of the general formula (1)

(1)

or the general formula (2)

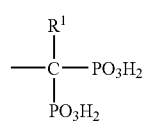
(2)

where $R^1$ is a hydrogen atom or a group having from 1 to 20 carbon atoms.

4. The membrane of claim 1, characterized in that the mixture prepared in step A) comprises aromatic or heteroaromatic tetraamino compounds of the formula (C)

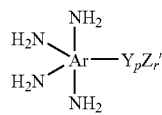
(C)

where
Ar is an aromatic or heteroaromatic group,
Y is a bond or a group having from 1 to 20 carbon atoms,
p is an integer from 1 to 4 and represents the number of bonds or groups Y via which the group Z is bound to the group Ar,
r is an integer from 1 to 4 and represents the number of groups Z which are bound to the group Y or, if Y is a bond, to the aromatic or heteroaromatic group Ar, and
Z' is a group of the general formula (3)

(3)

or the general formula (4)

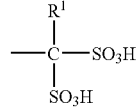
(4)

where $R^1$ is a hydrogen atom or a group having from 1 to 20 carbon atoms.

5. The membrane of claim 1, characterized in that the mixture prepared in step A) comprises aromatic or heteroaromatic carboxylic compounds of the formula (D)

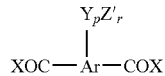
(D)

where

Ar is an aromatic or heteroaromatic group which optionally bears further substituents, X is a halogen atom or a group of the formula OR², where R² is a hydrogen atom or a group having from 1 to 20 carbon atoms, Y is a bond or a group having from 1 to 20 carbon atoms, p is an integer from 1 to 4 and represents the number of bonds or groups Y via which the group Z is bound to the group Ar, r is an integer from 1 to 4 and represents the number of groups Z which are bound to the group Y or, if Y is a bond, to the aromatic or heteroaromatic group Ar, and Z' is a group of the general formula (3)

—SO₃H    (3)

or the general formula (4)

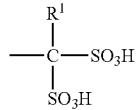

(4)

where R¹ is a hydrogen atom or a group having from 1 to 20 carbon atoms.

6. The membrane of claim 1, characterized in that the mixture prepared in step A) comprises aromatic or heteroaromatic tetraamino compounds which contain no phosphonic acid groups and aromatic or heteroaromatic carboxylic compounds which contain at least one phosphonic acid group.

7. The membrane of claim 1, characterized in that the mixture prepared in step A) comprises 3,3',4,4'-tetraaminobiphenyl, 2,3,5,6-tetraaminopyridine, or 1,2,4,5-tetraaminobenzene.

8. The membrane of claim 1, characterized in that the mixture prepared in step A) comprises isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-dicarboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or acid chlorides.

9. The membrane of claim 1, characterized in that the mixture prepared in step A) comprises 2,3-diamino-5-carboxyphenylphosphonic acid, 2,3-diamino-6-carboxyphenylphosphonic acid, and 3,4-diamino-6-carboxyphenylphosphonic acid.

10. The membrane of claim 1, characterized in that the mixture prepared in step A) comprises 2,3-diamino-5-carboxyphenylsulfonic acid, 2,3-diamino-6-carboxyphenylsulfonic acid, and 3,4-diamino-6-carboxyphenylsulfonic acid.

11. The membrane of claim 1, characterized in that the mixture prepared in step A) comprises aromatic tricarboxylic compounds selected from tricarboxylic acids, their C1-C20-alkyl esters or C5-C12-aryl esters or their acid anhydrides or their acid halides or tetracarboxylic acids, their C1-C20-alkyl esters or C5-C12-aryl esters or their acid anhydrides or their acid halides.

12. The membrane of claim 11, characterized in that the mixture prepared in step A) comprises: 1,3,5-benzenetricarboxylic acid (trimesic acid), 2,4,5-benzenetricarboxylic acid (trimellitic acid), (2-carboxyphenyl)iminodiacetic acid 3,5,3'-biphehyltricarboxylic acid, 3,5,4'-biphenyltricarboxylic acid, 2,4,6-pyridinetricarboxylic acid, benzene-1,2,4,5-tetracarboxylic acid, naphthalene-1,4,5,8-tetracarboxylic acid, 3,5,3',5'-biphenyltetracarboxylic acid, benzophenonetetracarboxylic acid, 3,3',4,4'-biphenyltetracarboxylic acid, 2,2',3,3'-biphenyltetracarboxylic acid, or 1,2,5,6-naphthalenetetracarboxyllic acid.

13. The membrane of claim 11, characterized in that the content of tricarboxylic compound or tetracarboxylic compound is in the range of from 0 to 30 mol % based on dicarboxylic acid used.

14. The membrane of claim 13, characterized in that the content of tricarboxylic compound or tetracarboxylic compound is in the range of from 0.1 to 20 mol % based on dicarboxylic acid used.

15. The membrane of claim 14, characterized in that the content of tricarboxylic compound or tetracarboxylic compound is in the range of from 0.5 to 10 mol % based on dicarboxylic acid used.

16. The membrane of claim 1, characterized in that the mixture prepared in step A) comprises heteroaromatic dicarboxylic compound, tricarboxylic compound or tetracarboxylic compound which contain at least one nitrogen, oxygen, sulfur, or phosphorus atom in the aromatics.

17. The membrane of claim 16, characterized in that pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid or their C1-C20-alkyl esters or C5-C12-aryl esters or their acid anhydrides or their acid chlorides are used.

18. The membrane as claimed in claim 1, characterized in that the mixture prepared in step A) comprises diaminobenzoic acid or its monohydrochloride and dihydrochloride salts.

19. The membrane as claimed in claim 1, characterized in that the solution produced in step A) further comprises dispersed or suspended polymer.

20. The membrane of claim 1, characterized in that the treatment according to step F) is carried out at temperatures in the range of from 0° C. to 150° C. in the presence of moisture.

21. The membrane of claim 1, characterized in that the treatment of the membrane in step F) is carried out from 10 seconds to 300 hours.

22. The membrane of claim 1, characterized in that the membrane formed after step F) is crosslinked by action of oxygen.

23. The membrane of claim 1, characterized in that a layer having a thickness of from 20 to 4000 μm is produced in step C) or step D).

24. The membrane of claim 1, characterized in that the membrane formed after step F) has a thickness of from 15 to 3000 μm.

25. A membrane-electrode unit comprising at least one electrode and at least one membrane as claimed in claim 1.

26. An electrode having a proton-conducting polymer coating which is based on polyazoles and is obtainable by a process comprising the steps:

A) mixing one or more aromatic or heteroaromatic tetraamino compounds with one or more aromatic or heteroaromatic carboxylic compounds in polyphosphoric acid to form a solution or dispersion, wherein the carboxylic compounds contain at least two groups selected from acids, esters, acid halides or acid anhydrides, with at least part of the tetraamino compounds or the carboxylic compounds comprising at least one phosphonic acid group; or mixing one or more aromatic or heteroaromatic diaminocarboxylic compounds in polyphosphoric acid to form a solution or dispersion, wherein the diaminocarboxylic compounds contain a group selected from acids and esters, wherein at least a part of said diaminocarboxylic compounds comprises phosphonic acid groups;

B) heating the solution or dispersion obtained according to step A) under inert gas to temperatures of up to 350° C. to form polyazole polymer; and C) applying a layer using the mixture from step B) to an electrode, thus forming a membrane on the electrode; or D) applying the solution or dispersion from step A) to an electrode, thus forming a membrane on the electrode; and E) heating the membrane formed in step D) under inert gas to temperatures of up to 325° C. to form polyazole polymers; and F) partially hydrolyzing the polyphosphoric acid moieties of the electrode membrane formed in step C) or step E) until the membrane has a surface hardness, wherein the concentration of phosphoric acid in the membrane of step (F) is from 10 to 80 mols of phosphoric acid per mol of a repeating unit of the polyazole polymer.

27. The electrode of claim 26, wherein the membrane has a thickness of from 2 to 3000 μm.

28. A membrane-electrode unit comprising at least one electrode having a proton-conducting polymer coating which is based on polyazoles and is prepared by the following steps:

A) mixing one or more aromatic or heteroaromatic tetraamino compounds with one or more aromatic or heteroaromatic carboxylic compounds in polyphosphoric acid to form a solution or dispersion, wherein the carboxylic compounds contain at least two groups selected from acids, esters, acid halides or acid anhydrides, with at least part of the tetraamino compounds or the carboxylic compounds comprising at least one phosphonic acid group; or mixing one or more aromatic or heteroaromatic diaminocarboxylic compounds in polyphosphoric acid to form a solution or dispersion, wherein the diaminocarboxylic compounds contain a group selected from acids and esters, wherein at least a part of said diaminocarboxylic compounds comprises phosphonic acid groups;

B) heating the solution or dispersion obtained according to step A) under inert gas to temperatures of up to 350° C. to form polyazole polymer; and C) applying a layer using the mixture from step B) to an electrode, thus forming a membrane on the electrode; or D) applying a solution or dispersion from step A) to an electrode, thus forming a membrane on the electrode; and E) heating the membrane formed in step D) under inert gas to temperatures of up to 325° C. to form polyazole polymers; and F) partially hydrolyzing the polyphosphoric acid moieties of the electrode membrane formed in step C) until the membrane has a surface hardness, wherein the concentration of phosphoric acid in the membrane of step (F) is from 10 to 80 mols of phosphoric acid per mol of a repeating unit of the polyazole polymer.

29. A fuel cell comprising one or more membrane-electrode units as claimed in claim 28.

* * * * *